United States Patent
Murayama et al.

(10) Patent No.: US 7,099,279 B2
(45) Date of Patent: Aug. 29, 2006

(54) MEDIA DATA CODING AND MULTIPLEXING APPARATUS, MEDIA DATA CODING AND MULTIPLEXING SYSTEM, AND MEDIA DATA CODING AND MULTIPLEXING METHOD

(75) Inventors: Shu Murayama, Tokyo (JP); Susumu Oka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 913 days.

(21) Appl. No.: 09/765,670

(22) Filed: Jan. 22, 2001

(65) Prior Publication Data
US 2001/0030980 A1  Oct. 18, 2001

(30) Foreign Application Priority Data
Apr. 18, 2000  (JP)  ............... P. 2000-116299

(51) Int. Cl.
H04J 1/16 (2006.01)
H04J 3/02 (2006.01)

(52) U.S. Cl. ..................... 370/252; 370/537
(58) Field of Classification Search ............... 370/535, 370/536, 537, 538, 540, 252
See application file for complete search history.

(56) References Cited

U.S. PATENT DOCUMENTS 5,500,672 A * 3/1996 Fujii ................. 348/14.13
5,671,226 A * 9/1997 Murakami et al. .......... 370/474
6,167,084 A * 12/2000 Wang et al. ............ 375/240.02
6,356,589 B1 * 3/2002 Gebler et al. ............ 375/240.1
6,404,818 B1 * 6/2002 Obikane ................ 375/240.28
6,426,778 B1 * 7/2002 Valdez, Jr. .................. 348/461
6,490,243 B1 * 12/2002 Tanaka et al. .............. 370/216
6,542,518 B1 * 4/2003 Miyazawa .................. 370/468
6,584,120 B1 * 6/2003 Shiomoto et al. ........... 370/473
6,845,107 B1 * 1/2005 Kitazawa et al. ........... 370/537
2001/0001611 A1 * 5/2001 Yuzawa ...................... 370/475

FOREIGN PATENT DOCUMENTS

| JP | 7115649 | 5/1995 |
|---|---|---|
| JP | 10-51496 A | 2/1998 |
| JP | 10-191276 A | 7/1998 |
| JP | 11-163817 A | 6/1999 |

* cited by examiner

*Primary Examiner*—Andrew C. Lee
(74) *Attorney, Agent, or Firm*—Birch, Stewart, Kolasch & Birch, LLP

(57) ABSTRACT

A plurality of media data coding and multiplexing apparatus are connected, a video signal having a large information amount is processed in parallel in the plurality of media data coding and multiplexing apparatus, other media data pieces of an audio signal and a data signal are processed in one of the plurality of the media data coding and multiplexing apparatus, and a multiplexing section of the one of the plurality of the media data coding and multiplexing apparatus combines the signals and output multiplex streams output from other media data coding and multiplexing apparatus into one output multiplex stream.

14 Claims, 5 Drawing Sheets

MEDIA DATA CODING AND MULTIPLEXING APPARATUS, MEDIA DATA CODING AND MULTIPLEXING SYSTEM, AND MEDIA DATA CODING AND MULTIPLEXING METHOD

BACKGROUND OF THE INVENTION

1. Field of the Invention

This invention relates to a media data coding and multiplexing apparatus, a media data coding and multiplexing system, and a media data coding and multiplexing method for coding, packeting, and multiplexing a plurality of pieces of media data.

2. Description of the Related Art

In recent years, development of a highly efficient coding apparatus of a video signal has been shifting to development of a system intended for high-definition video including HDTV signals. To handle high-definition video, inevitably high-speed processing is required and generally is accomplished by parallel processing.

FIG. 5 is a block diagram of a media data coding and multiplexing apparatus in a related art. In the figure, numeral 50 denotes a video signal, numeral 60 denotes an audio signal, numeral 70 denotes a data signal, numeral 51 denotes a video coding section, numeral 61 denotes an audio coding section, numeral 71 denotes a multiplexing section, numeral 55 denotes a coded video signal, numeral 65 denotes a coded audio signal, and numeral 75 denotes a packet string.

FIG. 6 is a block diagram to show the configuration of a video coding section in the related art shown in JP-A-7-115649. In the figure, numeral 56 denotes a video signal dividing circuit, numeral 57 denotes a transmission circuit, numeral 58 denotes a quantization control circuit, numerals 511, 521, 531, and 541 denote divided video signals numerals, 512, 522, 532, and 542 denote coding units, numerals 513, 523, 533, and 543 denote coded video signals, numerals 514, 524, 534, and 544 denote transmission buffers, 515, 525, 535, and 545 denote packeted video signals, numerals 516, 526, 536, and 546 denote transmission buffer control signals, numeral 517, 527, 537, and 547 denote transmission buffer information pieces, numerals 518, 528, 538, and 548 denote quantization control signals, and numerals 519, 529, 539, and 549 denote video information pieces.

Next, the operation of the media data coding and multiplexing apparatus in the related art will be discussed with reference to FIG. 5.

The video signal 50 is coded in the video coding section 51 and is output to the multiplexing section 71 as the coded video signal 55. Likewise, the audio signal 60 is coded in the audio coding section 61 and is output to the multiplexing section 71 as the coded audio signal 65. The multiplexing section 71 packets and multiplexes the data signal 70 and the input coded video signal 55 and coded audio signal 65 and outputs the signals as the packet string 75.

Further, the operation of the video coding section in the related art will be discussed with reference to FIG. 6.

The video signal 50 input to the video coding section 51 is divided into four signals in the video signal dividing circuit 56 and the divided video signals 511, 521, 531, and 541 are output to the coding units 512, 522, 532, and 542 respectively.

The quantization control circuit 58 receives the video information pieces 519, 529, 539, and 549 each representing the nature of the video images processed in the coding units 512, 522, 532, and 542 and also receives the transmission buffer information pieces 517, 527, 537, and 547 each representing the state of the corresponding transmission buffer, generates the quantization control signals 518, 528, 538, and 548 used in the coding units 512, 522, 532, and 542 respectively, and outputs the quantization control signals 518, 528, 538, and 548 to the coding units 512, 522, 532, and 542 respectively.

The divided video signals 511, 521, 531, and 541 are coded in the coding units 512, 522, 532, and 542 based on the quantization control signals 518, 528, 538, and 548 and the coded video signals 513, 523, 533, and 543 are output to the transmission buffers 514, 524, 534, and 544 respectively.

The coded video signals 513, 523, 533, and 543 are buffered in the transmission buffers 514, 524, 534, and 544 respectively and the buffered video signals 515, 525, 535, and 545 are output to the transmission circuit 57 in order based on the transmission buffer control signals 516, 526, 536, and 546 output from the transmission circuit 57.

The buffered video signals 515, 525, 535, and 545 are output from the transmission circuit 57 as the coded video signal 55 of the video signal 50.

In the media data coding and multiplexing apparatus in the related art, as shown in FIG. 6, to handle low-definition video, one module consisting of the coding unit and the transmission buffer is provided and to handle high-definition video, two or more modules, for example, the coding units 512, 522, 532, and 542 and the transmission buffers 514, 524, 534, and 544 are provided for performing parallel processing, thereby realizing easiness of hardware configuration. In this case, however, easiness of hardware configuration containing the multiplexing function with any other media data such as audio data is not considered and the coding section for coding any other media data such as audio data and the multiplexing section for multiplexing a plurality of pieces of media data such as audio data are configured as the audio coding section 61 and the multiplexing section 71 aside from the video coding section 51, as shown in FIG. 5. Thus, the output function of multiplexed coded data cannot be provided simply by combining a plurality of modules and parallel processing control circuits of the video signal dividing circuit 56, etc.

SUMMARY OF THE INVENTION

It is an object of the invention to provide a media data coding and multiplexing apparatus, a media data coding and multiplexing system, and a media data coding and multiplexing method for making it possible to accomplish low-definition video coding, audio coding, and multiplexing a plurality of pieces of media data in a single module, to easily set parameters required at the multiplex media data coded stream preparation time in a batch, and to prepare a multiplex media data coded stream containing high-definition video by using a parallel processing control circuit similar to that in a related art and a plurality of the modules in combination.

It is another object of the invention to provide a media data coding and multiplexing apparatus, a media data coding and multiplexing system, and a media data coding and multiplexing method for making it possible to prepare a multiplex stream of a plurality of video, audio, etc., as well as high definition of video when a parallel processing control circuit similar to that in a related art and a plurality of the modules are used in combination.

According to the invention, there is provided a media data coding and multiplexing apparatus comprising a coding section for coding and outputting media data, a multiplexing section for packeting the media data output from the coding section and multiplexing the packet string, and a parameter setting section for selectively adding a parameter to the packet string from the multiplexing section and outputting the result.

According to the invention, there is provided a media data coding and multiplexing system comprising a plurality of media data coding and multiplexing apparatus, a video signal dividing circuit for dividing a video signal, and a control circuit for generating a control signal.

In the media data coding and multiplexing system, if no signal is input from any other media data coding and multiplexing apparatus and no signal is output to any other media data coding and multiplexing apparatus, the parameter setting section of the media data coding and multiplexing apparatus sets a parameter.

In the media data coding and multiplexing system, if no signal is input from any other media data coding and multiplexing apparatus and a signal is output to any other media data coding and multiplexing apparatus, the parameter setting section of the media data coding and multiplexing apparatus sets only a parameter not requiring continuity.

In the media data coding and multiplexing system, if a signal is input from any other media data coding and multiplexing apparatus and no signal is output to any other media data coding and multiplexing apparatus, the parameter setting section of the media data coding and multiplexing apparatus sets parameters containing portions unset in any other media data coding and multiplexing apparatus.

In the media data coding and multiplexing system, if a signal is input from any other media data coding and multiplexing apparatus and a signal is output to any other media data coding and multiplexing apparatus, the parameter setting section of the media data coding and multiplexing apparatus sets only a parameter not requiring continuity excluding input from any other media data coding and multiplexing apparatus.

In the media data coding and multiplexing system, the parameter setting section of the media data coding and multiplexing apparatus sets continuity index or clock reproduction information in multiplex units as the parameter.

In the media data coding and multiplexing system, input of one media data coding and multiplexing apparatus is coded data of a part of a video image and the multiplexing section of the media data coding and multiplexing apparatus inputs the coded data from a plurality of media data coding and multiplexing apparatus, and the parameter setting section sets parameters containing unset portions in input streams and outputs a coded stream of the whole video.

In the media data coding and multiplexing system, input of one media data coding and multiplexing apparatus is a multiplex media stream containing video, audio, data, etc., and the multiplexing section of the media data coding and multiplexing apparatus inputs the multiplex media stream from a plurality of media data coding and multiplexing apparatus, and the parameter setting section sets parameters containing unset portions in the input streams and outputs a multiplex media coded stream containing a plurality of video, audio, data, etc.

In the media data coding and multiplexing apparatus, the multiplexing section of the media data coding and multiplexing apparatus multiplexes in conformity with MPEG2 system standard, and the parameter setting section sets a parameter conforming to the standard and outputs a multiplex media data coded stream.

In the media data coding and multiplexing apparatus, the multiplexing section of the media data coding and multiplexing apparatus multiplexes in conformity with MPEG4 system standard, and the parameter setting section sets a parameter conforming to the standard and outputs a multiplex media data coded stream.

In the media data coding and multiplexing apparatus, the multiplexing section of the media data coding and multiplexing apparatus multiplexes in conformity with ITU-T H.223 standard, and the parameter setting section sets a parameter conforming to the standard and outputs a multiplex media data coded stream.

In the media data coding and multiplexing apparatus, the multiplexing section of the media data coding and multiplexing apparatus multiplexes in conformity with ITU-T H.225 standard, and the parameter setting section sets a parameter conforming to the standard and outputs a multiplex media data coded stream.

According to the invention, there is provided, in a multiplexing apparatus for coding various pieces of media data of video, audio, etc., packeting the media data, and multiplexing the packet string, a media data coding and multiplexing method comprising the steps of coding and outputting the media data, packeting the output media data and multiplexing the packet string, and selectively adding a parameter to the packet string and outputting the result.

DETAILED DESCRIPTION OF THE PRESENT INVENTION

FIRST EMBODIMENT

Figure 1:
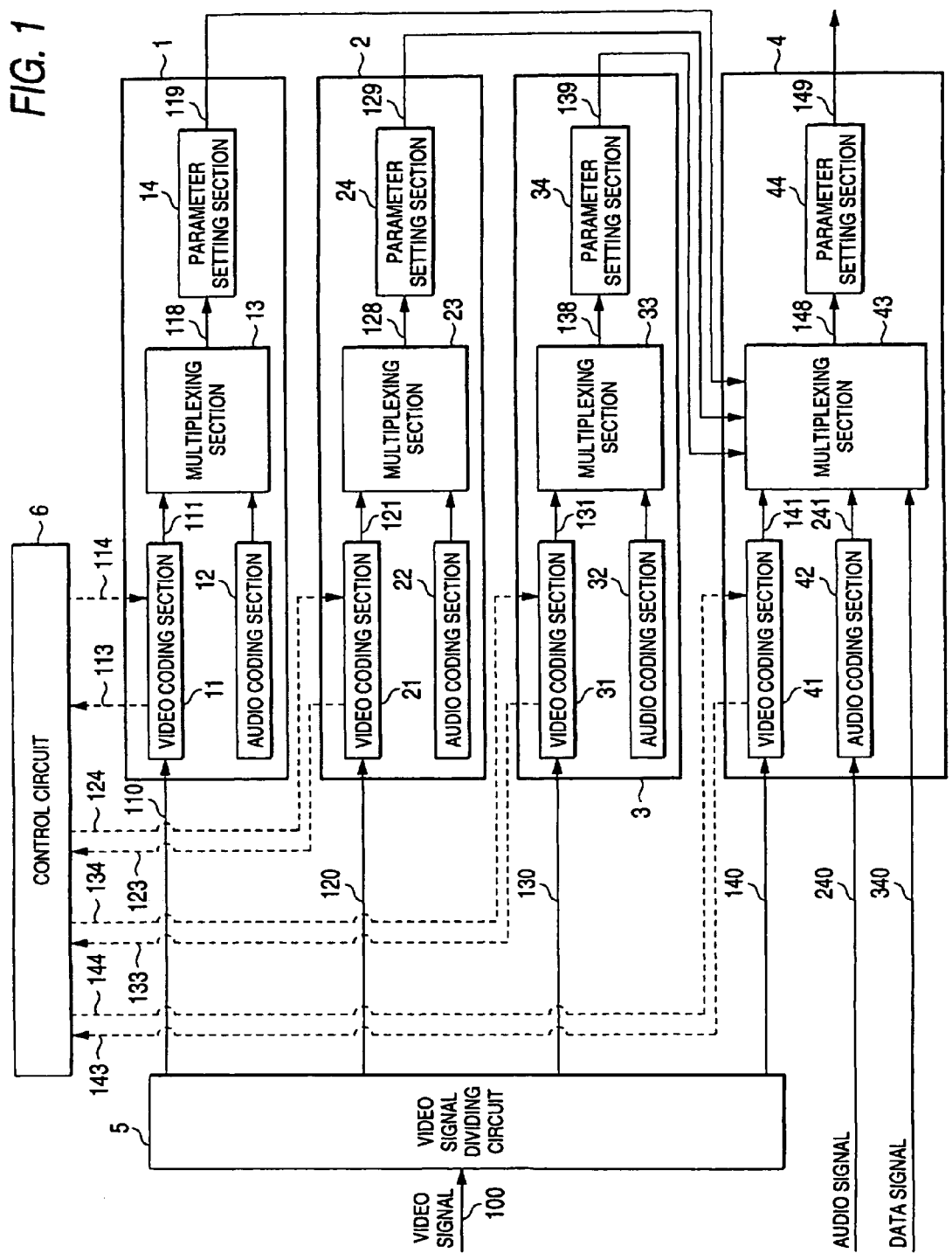
FIG. 1 is a block diagram of a media data coding and multiplexing system according to a first embodiment of the invention.

In a first embodiment of the invention, the case where high-definition, for example, HDTV video is coded in a media data coding and multiplexing system using a plurality of media data coding and multiplexing apparatus of the invention will be discussed.

Specifically, the configuration will be discussed wherein four media data coding and multiplexing apparatus 1 to 4 of the invention are connected, wherein a video signal 100 having a large information amount is processed in parallel in the media data coding and multiplexing apparatus 1 to 4, any other media data of an audio signal 240, a data signal 340, etc., is processed in the media data coding and multiplexing apparatus 4, and a multiplexing section 43 of the media data coding and multiplexing apparatus 4 combines the signals and output multiplex streams 119, 129, and 139 output from other media data coding and multiplexing apparatus 1 to 3 into one output multiplex stream 149 finally.

FIG. 1 is a block diagram of the media data coding and multiplexing system according to the first embodiment of the invention. The media data coding and multiplexing system consists of four media data coding and multiplexing apparatus 1 to 4 of the invention, one video signal dividing circuit 5, and one control circuit 6.

The media data coding and multiplexing apparatus 1 to 4 have the same internal configuration; each media data coding and multiplexing apparatus comprises a multiplexing section of six inputs of a coded video signal output from a video coding section of a video signal, a coded audio signal output from an audio coding section of an audio signal, a data signal, and three external inputs and a parameter setting section. However, for simplicity, only the apparatus 4 is shown with six inputs.

In the first embodiment, the audio signal input, the video signal input, and the external inputs of each media data coding and multiplexing apparatus 1 to 4 are not shown, but are possible in the configuration.

In FIG. 1, numerals 11, 21, 31, and 41 denote video coding sections, numerals 12, 22, 32, and 42 denote audio coding sections, numerals 13, 23, 33, and 43 denote multiplexing sections, numerals 14, 24, 34, and 44 denote parameter setting sections, numeral 100 denotes a video signal, numerals 110, 120, 130, and 140 denote divided video signals provided by the video signal dividing circuit 5, numerals 111, 121, 131, and 141 denote coded video signals, numeral 240 denotes an audio signal, numeral 241 denotes a coded audio signal, numeral 340 denotes a data signal, numerals 118, 128, 138, and 148 denote multiplex coded streams, numerals 119, 129, 139, and 149 denote output multiplex streams, numerals 113, 123, 133, and 143 denote information pieces concerning video such as the nature of video output from the video coding sections 11, 21, 31, and 41 to the control section 6, and numerals 114, 124, 134, and 144 denote control signals of quantization control signals, etc., output from the control section 6 to the video coding sections 11, 21, 31, and 41.

The operation is as follows:

The video signal dividing circuit 5 divides the input video signal 100 and outputs the divided video signals 110, 120, 130, and 140 to the video coding sections 11, 21, 31, and 41 of the media data coding and multiplexing apparatus 1 to 4, respectively.

The control circuit 6 receives inputs the information pieces 113, 123, 133, and 143 concerning video such as the complexity of video output from the video coding sections 11, 21, 31, and 41 and outputs the control signals 114, 124, 134, and 144 of quantization control signals, etc., at coding time to the video coding sections 11, 21, 31, and 41.

First, the operation of the media data coding and multiplexing apparatus 1 to 3 will be discussed.

In the first embodiment, the divided video signals 110, 120, and 130 provided by the video signal dividing circuit 5 provided to the media data coding and multiplexing apparatus 1 to 3. Audio, data, and external signals are not provided to the media data coding and multiplexing apparatus 1–3.

Therefore, in the media data coding and multiplexing apparatus 1 to 3, the video coding sections 11, 21, and 31 and the multiplexing sections 13, 23, and 33 code and multiplex only the video signal.

Further, since the media data coding and multiplexing apparatus 1 to 3 are not the media data coding and multiplexing apparatus for producing the final output, parameters are not set in the parameter setting section 14, 24, or 34.

Specifically, in the media data coding and multiplexing apparatus 1 to 3, the video coding sections 11, 21, and 31 code the divided video signals 110, 120, and 130 output from the video signal dividing circuit 5 based on the control signals 114, 124, and 134 output from the control circuit 6 as in the related art and output the coded video signals 111, 121, and 131.

The multiplexing sections 13, 23, and 33 packet the coded video signals 111, 121, and 131 output from the video coding sections 11, 21, and 31 and output multiplex coded streams 118, 128, and 138.

In the parameter setting sections 14, 24, and 34, no parameters are set in the multiplex coded streams 118, 128, and 138 output from the multiplexing sections 13, 23, and 33 and the multiplex coded streams 118, 128, and 138 are output as the output multiplex streams 119, 129, and 139.

Next, the operation of the media data coding and multiplexing apparatus 4 will be discussed.

The divided video signal 140 provided by the video signal dividing circuit 5, the audio signal 240, and the data signal 340 are input to the media data coding and multiplexing apparatus 4.

Therefore, in the media data coding and multiplexing apparatus 4, the video coding section 41 and the audio coding section 42 code and the multiplexing section 43 multiplexes the video signal 140, audio signal 240, and the data signal 340.

Further, since the media data coding and multiplexing apparatus 4 is the media data coding and multiplexing apparatus for producing the final output, a parameter is set in the parameter setting section 44.

Specifically, first, in the media data coding and multiplexing apparatus 4, the video coding section 41 codes the divided video signal 140 output from the video signal dividing circuit 5 based on the control signal 144 output from the control circuit 6 as in the related art and outputs the coded video signal 141 as in the media data coding and multiplexing apparatus 1 to 3.

On the other hand, the audio coding section 42 codes the input audio signal 240 and outputs the coded audio signal 241.

The multiplexing section 43 packets the coded video signal 141 output from the video coding section 41, the coded audio signal 241 output from the audio coding section 42, and the input data signal 340, and outputs the multiplex coded stream 148. The multiplexing section 43 also combines the multiplex stream 119, 129, and 139 into the multiplex coded stream 148.

In the parameter setting section 44, a parameter is set in the multiplex coded stream 148 output from the multiplexing section 43 and the multiplex coded stream 148 is output as the output multiplex stream 149.

The operation of the multiplexing sections 13, 23, 33, and 43 and the parameter setting sections 14, 24, 34, and 44 will be discussed in more detail by taking the case where the multiplex coded stream is a TS (transport stream) as an example.

The TS is made up of a plurality of TS packets (transport stream packets).

The TS packet consists of a header portion containing control information and a payload portion containing data. The header portion stores information of media data type, time information, etc.

First, the operation of the multiplexing sections 13, 23, 33, and 43 will be discussed.

The multiplexing sections 13, 23, and 33 packet the input coded video signals 111, 121, and 131, prepare TS packets each to which a header is added, multiplex, and output the multiplex coded streams 118, 128, and 138.

On the other hand, the multiplexing section 43 packets the coded video signal 141, the coded audio signal 241, and the data signal 340, prepares a TS packet to which a header is added, reads and multiplexes the multiplex streams 119, 129, and 139 in TS packet units so as to combine the TS packet with the multiplex streams 119, 129, and 139 input from other media data coding and multiplexing apparatus 1 to 3 already put into TS packets into one TS finally, and generates and outputs the multiplex coded stream 148 finally.

Next, the operation of the parameter setting sections 14, 24, 34, and 44 will be discussed.

When the multiplex coded stream is a TS, the parameter to be set in the parameter setting sections 14, 24, and 34 of the media data coding and multiplexing apparatus 1 to 3 which are not the media data coding and multiplexing apparatus for producing the final output is a parameter whose value does not require continuity, such as PID (Packet IDentifier) of the identifier of TS packets, and the parameter to be set in the parameter setting section 44 of the media data coding and multiplexing apparatus 4 of the media data coding and multiplexing apparatus for producing the final output is a parameter whose value has continuity, such as Continuity_counter (CC) (continuity index) or PCR (Program Clock Reference (clock reproduction information)). The CC is a four-bit counter value incremented every PID. The PCR is a 42-bit counter value generated based on a 27-MHz clock in the media data coding and multiplexing apparatus, and is added to the PS packet having a specific PID at given intervals. This value is used to reproduce a similar clock to that on the coding side on the decoding side.

When the multiplex coded stream is a TS, the same PID is added to the divided video signals 111, 121, 131, and 141 provided by the video signal dividing circuit 5. This means that the PID added to the TS packets of video of the multiplex streams 119, 129, 139, and 149 from the media data coding and multiplexing apparatus 1 to 3 input to the multiplexing section 43 of the media data coding and multiplexing apparatus 4 and the PID added to the TS packet of video newly generated in the multiplexing section 43 are the same.

That is, in the multiplex stream 149 output by the media data coding and multiplexing apparatus 4, continuity must be held for the parameters having continuity, such as CC, of the parameters added to the TS packets of video generated in the multiplexing sections 13, 23, 33, and 43 of the media data coding and multiplexing apparatus 1 to 4. Then, values are added to the parameters in a batch in the parameter setting section 44 of the media data coding and multiplexing apparatus 4 at the final stage rather than continuously added separately to the parameters in the multiplexing sections 13, 23, 33, and 43 of the media data coding and multiplexing apparatus 1 to 4.

Outputs of the multiplexing sections 13, 23, 33, and 43 of the media data coding and multiplexing apparatus 1 to 4 are also read in order, whereby continuous and serial data is sent as in the related art.

Like the CC, the PCR is also a parameter whose continuity must be held, of the parameters added to the TS packets of video images and thus a value is set at given intervals only in the parameter setting section 44 of the media data coding and multiplexing apparatus 4.

Figure 2:
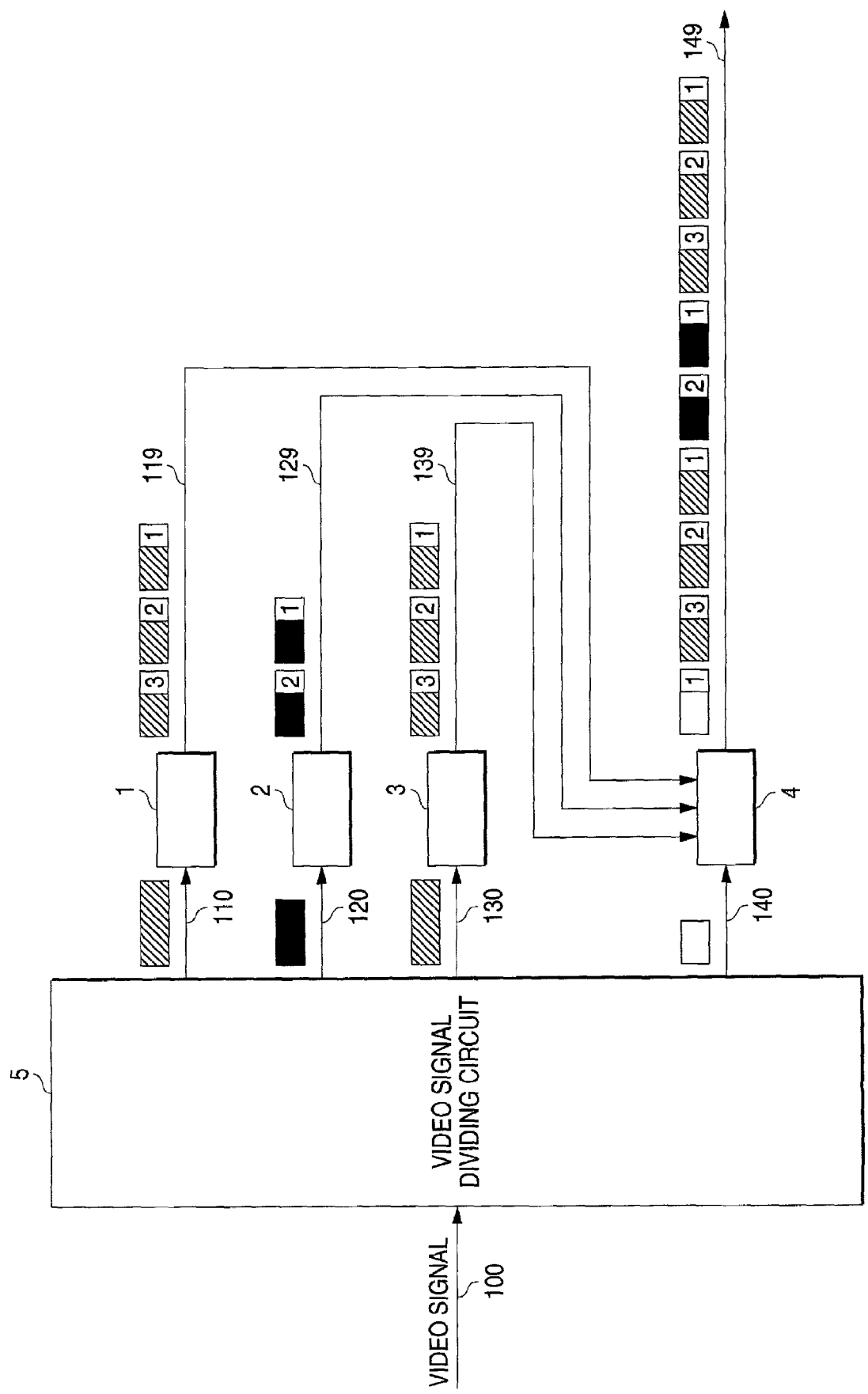
FIG. 2 is a drawing to show multiplex stream when parameter values requiring continuity are set separately in each media data coding and multiplexing apparatus.
Figure 3:
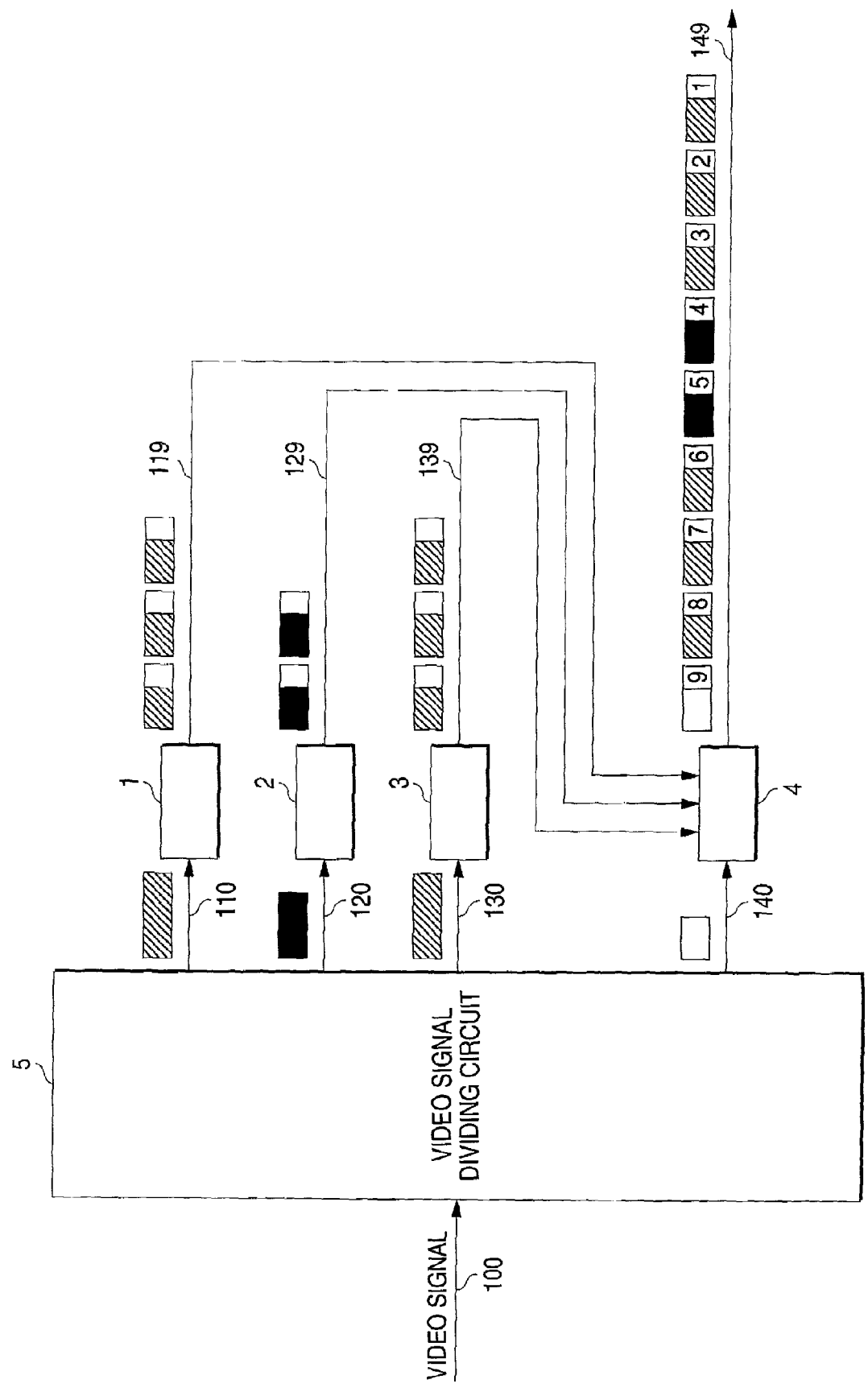
FIG. 3 is a drawing to show a multiplex stream when parameter values requiring continuity are set in a batch in the media data coding and multiplexing apparatus at the final stage.

FIGS. 2 and 3 are drawings to show the multiplex coded stream 149 with the CC values added to the TS packets. In the figure, the internal configuration of the media data coding and multiplexing apparatus, external control circuit, and the like are not shown.

First, FIG. 2 shows the case where the CC values are added to the TS packets in the media data coding and multiplexing apparatus 1 to 4; as seen in the figure, when the multiplex streams 119, 129, and 139 with the parameters added in the media data coding and multiplexing apparatus 1 to 3, output therefrom become one multiplex coded stream 149 in the media data coding and multiplexing apparatus 4, continuous values are not added to the multiplex coded stream 149.

On the other hand, FIG. 3 shows the case where the CC values are added to the TS packets only in the media data coding and multiplexing apparatus 4 at the final stage; as seen in the figure, when the multiplex streams 119, 129, and 139 with the parameters added in the media data coding and multiplexing apparatus 1 to 3, output therefrom become one multiplex coded stream 149 in the media data coding and multiplexing apparatus 4, continuous values are added to the multiplex coded stream 149.

The operation in the first embodiment becomes as shown in FIG. 3 because the parameters are added in one batch in the parameter setting section 44 of the media data coding and multiplexing apparatus 4 at the final stage as described above.

As described above, according to the first embodiment, the parallel processing control circuit and the plurality of media data coding and multiplexing apparatus are used in combination, whereby multiplex media data coded stream preparation containing high-definition video can be easily accomplished. Further, if parameters having continuity are added only in the parameter setting section of the media data coding and multiplexing apparatus at the final stage, parameters which need to be set continuously can be set in one batch and continuity can be maintained easily.

In the first embodiment, the voice signal and the data signal are provided to only one of the four connected media data coding and multiplexing apparatus. However all of four into which one is divided like the video signal may be provided or the voice signal and the data signal may be provided to more than one media data coding and multiplexing apparatus.

In the description of the first embodiment, the multiplexing section of each media data coding and multiplexing apparatus can receive one video signal, one audio signal, one data signal, and three external signals, but the number of inputs may be increased or decreased to match the media data to be processed.

Further, if no video signal and no audio signal are provided, instead a data signal, etc., may be provided and be allowed to pass through the video coding section and the audio coding section without coding.

That is, the inputs can also be used for inputting the data signal and external signals.

In the first embodiment, audio coding is executed in the media data coding and multiplexing apparatus 4, but it is also possible to stop audio coding, namely, not to operate the audio coding section depending on the processing amount required for video coding and the processing capability of the video coding section of the media data coding and multiplexing apparatus. Thus, it is also possible to connect a newly added media data coding and multiplexing apparatus f or coding video and audio.

In the first embodiment, processing of the media data coding and multiplexing apparatus 1 to 3 is limited only to video coding, but inputs other than the video input may be used for inputting a plurality of multiplex media data outputs to the media data coding and multiplexing apparatus 4, whereby it is possible to output multiplex media data coded stream containing a plurality of video, audio, and data.

In the first embodiment, the information pieces 113, 123, 133, and 143 concerning video such as the nature of the video image are output from the video coding sections 11, 21, 31, and 41 to the control circuit 6, but the whole video may be output collectively from the video signal dividing circuit 5.

In the first embodiment, the control signals 114, 124, 134, and 144 of quantization control signals, etc., are provided from the control circuit 6 to the video coding sections 11, 21, 31, and 41, but may be provided collectively to the video signal dividing circuit 5 so that they are input to the video coding sections 11, 21, 31, and 41 together with the divided video signals 110, 120, 130, and 140. At this time, the same may be used as the control signals 114, 124, 134, and 144.

In the first embodiment, the control circuit 6 for receiving the information pieces 113, 123, 133, and 143 concerning video such as the nature of the video image and outputting the control signals 114, 124, 134, and 144 is placed outside the media data coding and multiplexing apparatus, but may be placed inside each media data coding and multiplexing apparatus.

Further, in this case, the control circuit 6 within any one of the media data coding and multiplexing apparatus 1 to 4 may be used for receiving and providing the control signals and the information pieces concerning video such as the nature of video from and to the video coding section in each media data coding and multiplexing apparatus.

In the description of the first embodiment, parameters are not set in the parameter setting section 14, 24, or 34, but dummy data may be set as parameters.

In the first embodiment, the media data coding and multiplexing apparatus 1 to 4 differ in parameter addition method of the CC value, etc., according to where the media data coding and multiplexing apparatus 1 to 4 are connected, but the CC value may be added at any connection positions and the media data coding and multiplexing apparatus 4 at the final stage may overwrite the value with the correct value. In this case, however, each parameter setting section 14, 24, 34, 44, references only the PID and adds the CC value to the target TS packet without regard to whether the input is a TS packet prepared in the media data coding and multiplexing apparatus or a TS packet making up a part of a multiplex coded stream input from the outside.

The media data coding and multiplexing apparatus in the first embodiment does not depend on the platform and may be, for example, not only one LSI, but also one circuit board, etc.

In the first embodiment, the media data coding and multiplexing apparatus 1 to 3 output multiplex streams and, for example, to put into TS, TS packets are already formed and processing of adding a TS header, etc., is not performed in the multiplexing section 43 of the media data coding and multiplexing apparatus 4, but if the media data coding and multiplexing apparatus 1 to 3 are used to code only video and others are not input as shown in the embodiment, the coded video signals 111, 121, and 131 may be output intact to the multiplexing sections 13, 23, and 33 and be put into TS packets in the multiplexing section 43 of the media data coding and multiplexing apparatus 4.

SECOND EMBODIMENT

In a second embodiment of the invention, the case where low-definition, for example, NTSC video and audio are coded in a media data coding and multiplexing system using only one media data coding and multiplexing apparatus of the invention will be discussed.

Figure 4:
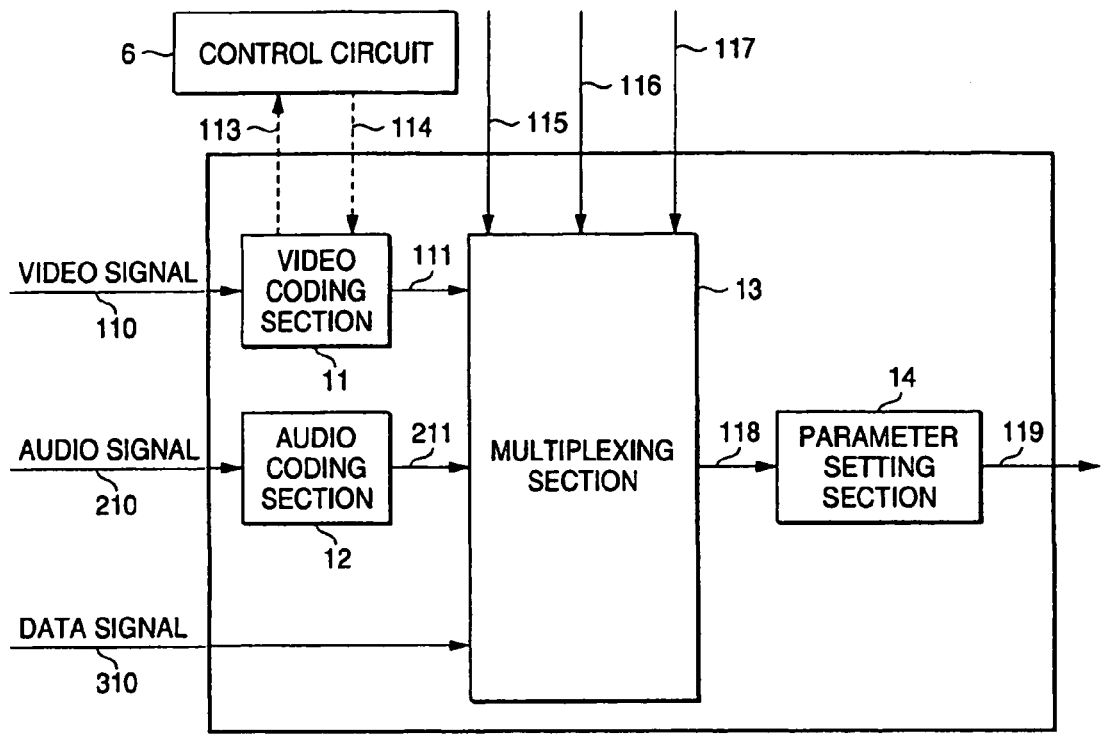
FIG. 4 is a block diagram of a media data coding and multiplexing apparatus according to a second embodiment of the invention.
Figure 5:
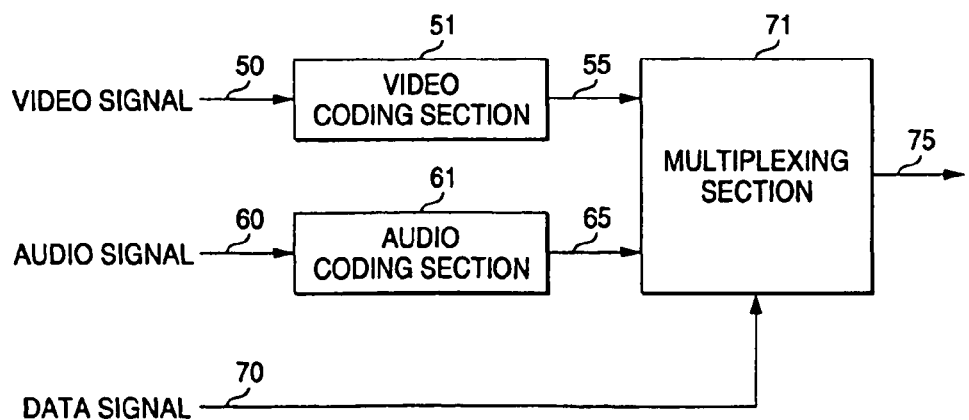
FIG. 5 is a block diagram of a media data coding and multiplexing apparatus in a related art.
Figure 6:
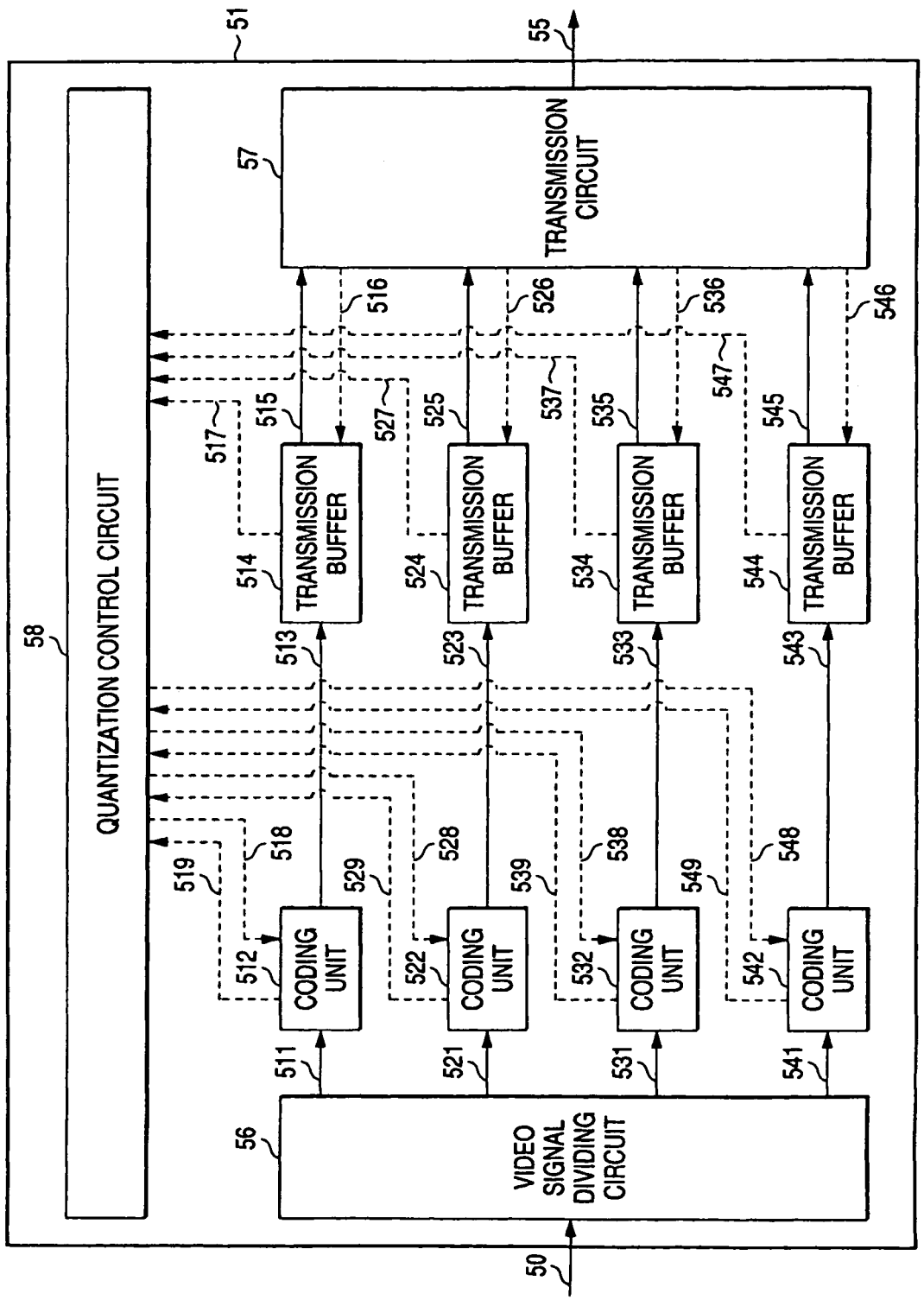
FIG. 6 is a block diagram of a video coding section in the media data coding and multiplexing apparatus in the related art.

FIG. 4 is a general block diagram of the media data coding and multiplexing apparatus 1 according to the second embodiment of the invention.

In FIG. 4, numeral 11 denotes a video coding section, numeral 12 denotes an audio coding section, numeral 13 denotes a multiplexing section, numeral 14 denotes a parameter setting section, numeral 110 denotes a video signal, numeral 111 denotes a coded video signal, numeral 210 denotes an audio signal, numeral 310 denotes a data signal, numerals 115, 116, and 117 are external inputs, numeral 211 denotes a coded audio signal, numeral 118 denotes a multiplex coded stream, numeral 119 denotes an output multiplex stream, numeral 113 denotes information concerning video such as the nature of the video image output from the video coding section 11 to a control circuit 6, and numeral 114 denotes a control signal of a quantization control signal, etc., output from the control circuit 6 to the video coding section 11.

The operation is as follows:

The video coding section 11 codes the input video signal 110 based on the control signal 114 output from the control circuit 6 as in the related art and outputs the coded video signal 111.

The audio coding section 12 codes the input audio signal 210 and outputs the coded audio signal 211.

The multiplexing section 13 packets the coded video signal 111 output from the video coding section 11, the coded audio signal 211 output from the audio coding section 12, the input data signal 310, and the external inputs 115, 116, and 117 and outputs the result as the multiplex coded stream 118. The external inputs 115, 116, and 117 may receive multiplexed streams from other media coding and multiplexing apparatus, but are not limited to those only.

In the parameter setting section 14, a parameter whose value does not require continuity, for example, PID and a parameter whose value has continuity, for example, CC, PCR, etc., are set in the multiplex coded stream 118 output from the multiplexing section 13, and the result is output as the output multiplex stream 119.

As described above, according to the second embodiment of the invention, the parameter setting section for setting parameters and outputting the output multiplex stream is provided, whereby the parameters required at the multiplex stream generation time can be easily set in a batch.

According to the second embodiment, not only the media data coding and multiplexing system made up of a plurality of pieces of media data coding and multiplexing apparatus, but also the media data coding and multiplexing apparatus can operate on its own.

In the description of the second embodiment, the control signal 114 is provided from the external control circuit 6, but the control circuit 6 may be placed in the media data coding and multiplexing apparatus 1.

The setup parameters in the parameter setting sections in the first and second embodiments are not limited to the CC or PCR.

The output streams in the first and second embodiments are not limited to the MPEG2 system standard (TS) and may be MPEG4 system standard, ITU-T H.223 standard, ITU-T H.225 standard, or the like.

According to the invention, there is provided a media data coding and multiplexing apparatus comprising a coding section for coding and outputting media data, a multiplexing section for packeting the media data output from the coding section and multiplexing the packet string, and a parameter setting section for selectively adding a parameter to the packet string from the multiplexing section and outputting the result, so that the parameter setting section can easily set the necessary parameters in a batch.

According to the invention, there is provided a media data coding and multiplexing system comprising a plurality of the media data coding and multiplexing apparatus, a video signal dividing circuit for dividing a video signal, and a control circuit for generating a control signal, so that high-definition video coding, audio coding, and multiplexing can be easily executed.

According to the media data coding and multiplexing system, if no signal is input from any other media data coding and multiplexing apparatus and no signal is output to any other media data coding and multiplexing apparatus, the parameter setting section sets a parameter, so that flexible connection configuration selection of the media data coding and multiplexing apparatus can be executed according to the definition of the video image and the processing capability of the module.

According to the media data coding and multiplexing system, if no signal is input from any other media data coding and multiplexing apparatus and a signal is output to any other media data coding and multiplexing apparatus, the parameter setting section sets only a parameter not requiring continuity, so that a parameter having continuity is not set and coding and multiplexing processing of any other media data coding and multiplexing apparatus is not affected.

According to the media data coding and multiplexing system, if a signal is input from any other media data coding and multiplexing apparatus and no signal is output to any other media data coding and multiplexing apparatus, the parameter setting section sets parameters containing portions unset in any other media data coding and multiplexing apparatus, so that parameters which need to be set continuously can be set in batch and continuity can be held easily.

According to the media data coding and multiplexing system, if a signal is input from any other media data coding and multiplexing apparatus and a signal is output to any other media data coding and multiplexing apparatus, the parameter setting section sets only a parameter not requiring continuity excluding input from any other media data coding and multiplexing apparatus, so that a parameter having continuity is not set and coding and multiplexing processing of any other media data coding and multiplexing apparatus is not affected.

According to the media data coding and multiplexing system, the parameter setting section sets continuity index or clock reproduction information in multiplex units as the parameter, so that parameters which need to be set continuously can be set in a batch.

According to the media data coding and multiplexing system, input of one media data coding and multiplexing apparatus is coded data of a part of a video image and the multiplexing section inputs the coded data from a plurality of media data coding and multiplexing apparatus, and the parameter setting section sets parameters containing unset portions in input streams and outputs a coded stream of the whole video, so that parameters which need to be set continuously can be set in batch and continuity can be held easily.

According to the media data coding and multiplexing system, input of one media data coding and multiplexing apparatus is a multiplex media stream containing video, audio, data, etc., and the multiplexing section inputs the multiplex media stream from a plurality of media data coding and multiplexing apparatus, and the parameter setting section sets parameters containing unset portions in the input streams and outputs a multiplex media coded stream containing a plurality of video, audio, data, etc., so that parameters which need to be set continuously can be set in a batch.

According to the media data coding and multiplexing apparatus, the multiplexing section multiplexes in conformity with MPEG2 system standard, and the parameter setting section sets a parameter conforming to the standard and outputs a multiplex media data coded stream, so that a multiplex media coded stream of video, audio, etc., conforming to the MPEG2 system standard can be prepared easily.

According to the media data coding and multiplexing apparatus, the multiplexing section multiplexes in conformity with MPEG4 system standard, and the parameter setting section sets a parameter conforming to the standard and outputs a multiplex media data coded stream, so that a multiplex media coded stream of video, audio, etc., conforming to the MPEG4 system standard can be prepared easily.

According to the media data coding and multiplexing apparatus, the multiplexing section multiplexes in conformity with ITU-T H.223 standard, and the parameter setting section sets a parameter conforming to the standard and outputs a multiplex media data coded stream, so that a multiplex media coded stream of video, audio, etc., conforming to the ITU-T H.223 standard can be prepared easily.

According to the media data coding and multiplexing apparatus, the multiplexing section multiplexes in conformity with ITU-T H.225 standard, and the parameter setting section sets a parameter conforming to the standard and outputs a multiplex media data coded stream, so that a multiplex media coded stream of video, audio, etc., conforming to the ITU-T H.225 standard can be prepared easily.

According to the invention, there is provided, in a multiplexing apparatus for coding various pieces of media data of video, audio, etc., packeting the media data, and multiplexing the packet string, a media data coding and multiplexing method comprising the steps of coding and outputting the media data, packeting the output media data and multiplexing the packet string, and selectively adding a parameter to the packet string and outputting the result, so that the necessary parameters can be easily set in a batch.

According to the media data coding and multiplexing apparatus, the media data coding and multiplexing system, and the media data coding and multiplexing method according to the invention, the parameters required at the multiplex media data coded stream preparation time can be set easily, and low-definition video coding, audio coding, and multiplexing a plurality of pieces of media data can be accomplished in a single module, so that a multiplex media data coded stream containing high-definition video can be prepared by using a parallel processing control circuit and a plurality of the modules in combination and when a parallel processing control circuit and a plurality of the modules are used in combination, a multiplex stream of a plurality of video, audio, etc., as well as definition of video can be prepared.

What is claimed is:

1. A media data coding and multiplexing apparatus comprising:
   a coding section for coding a plurality of media data to output a plurality of coded media data, respectively;
   a multiplexing section for packeting the plurality of coded media data output from the coding section to generate a plurality of packet strings and multiplexing the plurality of packet strings with each other to output a multiplexed packet string; and
   a parameter setting section for selectively adding, after multiplexing has occurred, a parameter to the multiplexed packet string output from the multiplexing section to output an output multiplex stream.

2. A media data coding and multiplexing system comprising:
   a video signal dividing circuit for dividing a video signal into a plurality of divided data;
   a plurality of media data coding and multiplexing apparatuses each comprising:
   a coding section for coding a plurality of media data including one of the plurality of divided data to output a plurality of coded data;
   a multiplexing section for packeting the plurality of coded data output from the coding section to generate a plurality of packet strings and multiplexing the plurality of packet strings with each other to generate a multiplexed packet string; and
   a parameter setting section for selectively adding a parameter to the multiplexed packet string output from the multiplexing section and outputting an output multiplex stream; and
   a control circuit for generating a control signal for controlling each of the plurality of coding and multiplexing apparatuses.

3. The media data coding and multiplexing system as claimed in claim 2 wherein in each of the plurality of media data coding and multiplexing apparatuses,
   if no signal is input from any other media data coding and multiplexing apparatuses and no signal is output to any other media data coding and multiplexing apparatuses, the parameter setting section sets the parameter in the output multiplex stream.

4. The media data coding and multiplexing system as claimed in claim 2 wherein,
   in each of the plurality of media data coding and multiplexing apparatuses,
   if no signal is input from any other media data coding and multiplexing apparatuses and a signal is output to any other media data coding and multiplexing apparatuses, the parameter setting section sets only a parameter in the output multiplex stream not requiring continuity.

5. The media data coding and multiplexing system as claimed in claim 2 wherein
   in each of the plurality of media data coding and multiplexing apparatuses,
   if a signal is input from any other media data coding and multiplexing apparatuses and no signal is output to any other media data coding and multiplexing apparatuses, the parameter setting section sets the parameter in the output multiplex stream containing unset portions in any other media data coding and multiplexing apparatuses.

6. The media data coding and multiplexing system as claimed in claim 2 wherein
   in each of the media data coding and multiplexing apparatuses,
   if a signal is input from any other media data coding and multiplexing apparatus and a signal is output to any other media data coding and multiplexing apparatus, the parameter setting section sets only a parameter in the output multiplex stream not requiring continuity excluding an input from any other media data coding and multiplexing apparatuses.

7. The media data coding and multiplexing system as claimed in claim 2 wherein
   in each of the media data coding and multiplexing apparatuses,
   the parameter setting section sets continuity index or clock reproduction information in multiplex units as the parameter.

8. The media data coding and multiplexing system as claimed in claim 2 wherein
   in each of the media data coding and multiplexing apparatuses,
   an input of one of the plurality of media data coding and multiplexing apparatuses is coded data of a part of video and the multiplexing section inputs the coded data from a plurality of media data coding and multiplexing apparatuses, and
   the parameter setting section sets a parameter in the output multiplex stream containing unset portions in input streams and outputs a coded stream of the whole video.

9. The media data coding and multiplexing system as claimed in claim 2 wherein
   in each of the media data coding and multiplexing apparatuses,
   an input of one of the plurality of media data coding and multiplexing apparatuses is a multiplex media stream containing video, audio, and data, and the multiplexing section receives the multiplex media stream from other media data coding and multiplexing apparatuses, and
   the parameter setting section sets a parameter in the output multiplex stream containing unset portions in the input streams and outputs a multiplex media coded stream containing a plurality of video, audio, and data.

10. The media data coding and multiplexing apparatus as claimed in claim 1 wherein the multiplexing section performs the multiplexing in conformity with MPEG2 system standard, and wherein
    the parameter setting section sets a parameter in the output multiplex stream conforming to the MPEG2 standard and outputs a multiplex media data coded stream.

11. The media data coding and multiplexing apparatus as claimed in claim 1 wherein the multiplexing section performs the multiplexing in conformity with MPEG4 system standard, and wherein
    the parameter setting section sets a parameter in the output multiplex stream conforming to the MPEG4 standard and outputs a multiplex media data coded stream.

12. The media data coding and multiplexing apparatus as claimed in claim 1 wherein the multiplexing section performs the multiplexing in conformity with ITU-T H.223 standard, and wherein the parameter setting section sets a parameter in the output multiplex stream conforming to the ITU-T H.223 standard and outputs a multiplex media data coded stream.

13. The media data coding and multiplexing apparatus as claimed in claim 1 wherein the multiplexing section multiplexes in conformity with ITU-T H.225 standard, and wherein the parameter setting section sets a parameter in the output multiplex stream conforming to the ITU-T H.225 standard and outputs a multiplex media data coded stream.

14. A media data coding and multiplexing method comprising:

coding a plurality of media data to output a plurality of coded media data, respectively;

packeting the plurality of coded media data to generate a plurality of packet strings and multiplexing the plurality of packet strings with each other to generate a multiplexed packet string; and selectively adding, after multiplexing has occurred, a parameter to the multiplexed packet string to output an output multiplex stream.

* * * * *